United States Patent
Mishra et al.

(10) Patent No.: US 12,054,277 B2
(45) Date of Patent: Aug. 6, 2024

(54) AIRCRAFT FUEL SYSTEMS

(71) Applicant: Textron Innovations Inc., Providence, RI (US)

(72) Inventors: Suvankar Mishra, Carrollton, TX (US); Ronald James Turner, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 836 days.

(21) Appl. No.: 17/064,520

(22) Filed: Oct. 6, 2020

(65) Prior Publication Data

US 2022/0106055 A1 Apr. 7, 2022

(51) Int. Cl.
*B64D 37/06* (2006.01)
*B64D 37/04* (2006.01)

(52) U.S. Cl.
CPC ............ *B64D 37/06* (2013.01); *B64D 37/04* (2013.01)

(58) Field of Classification Search
CPC .. B64D 2037/325; B64D 37/32; B64D 37/04; B64D 37/06; B64C 3/34; B64F 5/45
See application file for complete search history.

(56) References Cited

U.S. PATENT DOCUMENTS

| 3,224,623 | A | | 12/1965 | Knox et al. | |
|---|---|---|---|---|---|
| 3,787,279 | A | * | 1/1974 | Winchester | B64D 37/32 220/900 |
| 5,451,015 | A | | 9/1995 | Cronkhite et al. | |
| 6,076,769 | A | * | 6/2000 | Gallegos | B64D 37/06 244/135 R |
| 6,176,452 | B1 | | 1/2001 | Gallegos | |
| 7,959,983 | B1 | | 6/2011 | Farrar et al. | |
| 10,196,151 | B2 | * | 2/2019 | Peryea | B64D 37/06 |
| 10,301,032 | B2 | | 5/2019 | Carr et al. | |
| 11,491,867 | B2 | * | 11/2022 | Cragel | B60K 15/067 |
| 2005/0089661 | A1 | | 4/2005 | Hogenson et al. | |
| 2008/0085371 | A1 | | 4/2008 | Gudlavalleti et al. | |
| 2008/0302545 | A1 | | 12/2008 | Kulesha | |
| 2014/0144917 | A1 | | 5/2014 | Meillat et al. | |

(Continued)

FOREIGN PATENT DOCUMENTS

| CN | 105563970 A | * | 5/2016 | ............. B32B 27/08 |
|---|---|---|---|---|
| WO | 2019067917 A1 | | 4/2019 | |

OTHER PUBLICATIONS

"Polyurea FR 1044" Technical Data Sheet, 2015. Akfix coating (Year: 2015).*

(Continued)

*Primary Examiner* — Richard Green
(74) *Attorney, Agent, or Firm* — Lawrence Youst PLLC

(57) ABSTRACT

An aircraft fuel system includes a fuel cell adapted to contain fuel. A fuel cell receiving assembly has an inner surface adapted to receive the fuel cell. A shaped foam substrate is machined from a foam substrate to fit between the inner surface of the fuel cell receiving assembly and the fuel cell. A polyurea spray coating substantially covers the shaped foam substrate to form a fuel cell cushion. The polyurea spray coating is sprayable onto the shaped foam substrate such that the fuel cell cushion is substantially nonabsorbent of fuel. The fuel cell cushion is interposable between the inner surface of the fuel cell receiving assembly and the fuel cell to cushion the fuel cell from damage.

20 Claims, 9 Drawing Sheets

(56) References Cited

U.S. PATENT DOCUMENTS

| | | |
|---|---|---|
| 2016/0307555 A1 | 10/2016 | Demo et al. |
| 2017/0043879 A1 | 2/2017 | Perry et al. |
| 2018/0244397 A1 | 8/2018 | Carr et al. |
| 2018/0291813 A1 | 10/2018 | Ludin et al. |
| 2019/0039718 A1* | 2/2019 | Baines ...................... B64C 3/34 |
| 2022/0024325 A1* | 1/2022 | Pettey ................... B64D 37/32 |

OTHER PUBLICATIONS

Burchardt et al. âChapter 6—Elastic Bonding and Sealing in Industryâ 2006. Handbook of Adhesives and Sealants, vol. 2, pp. 355-480, xl-xlii. Elsevier Science Ltd. (Year: 2006).*

Somarathna et al. âThe use of polyurethane for structural and infrastructural engineering applications: A state-of-the-art reviewâ 2018. Construction and Building Materials, vol. 190, pp. 995-1014 (Year: 2018).*

European Exam Report; Application No. EP21194296.6; European Patent Office; Mar. 15, 2022.

European Search Report; Application No. EP21194296.6; European Patent Office; Feb. 15, 2022.

Properties of Polyureas; Polymerdatabase.com; Unknown Date.

Using Polyurea Coating to Protect Any Foam Creation; Wecutform.com; Dec. 2, 2014.

* cited by examiner

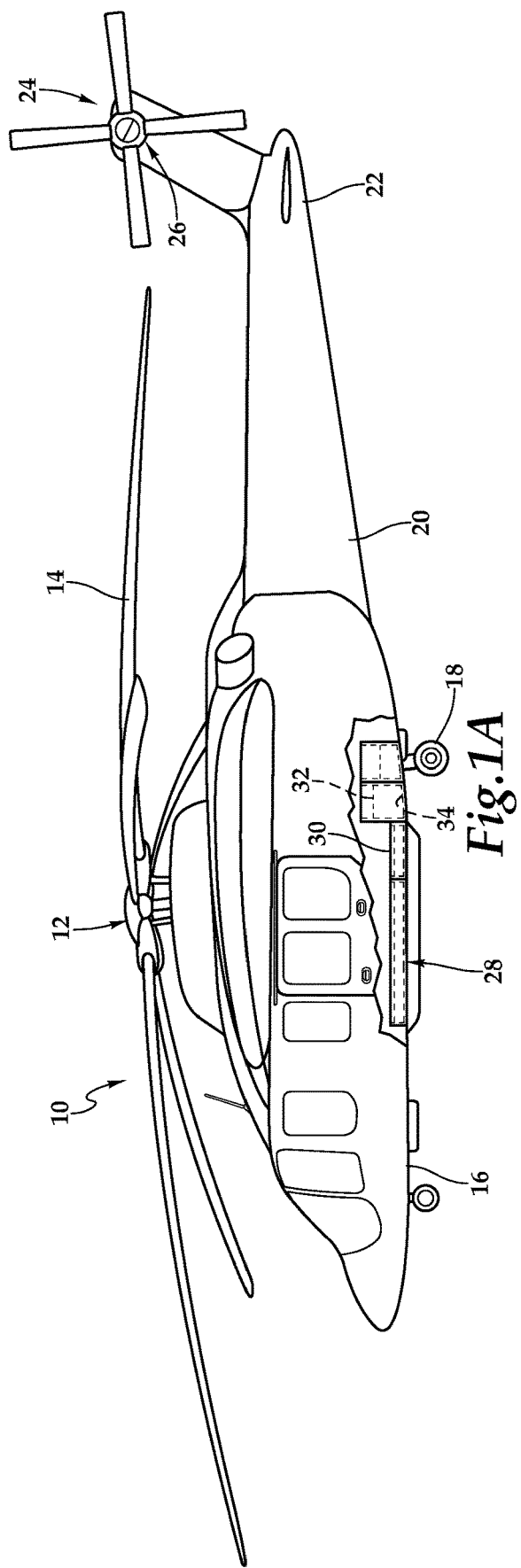
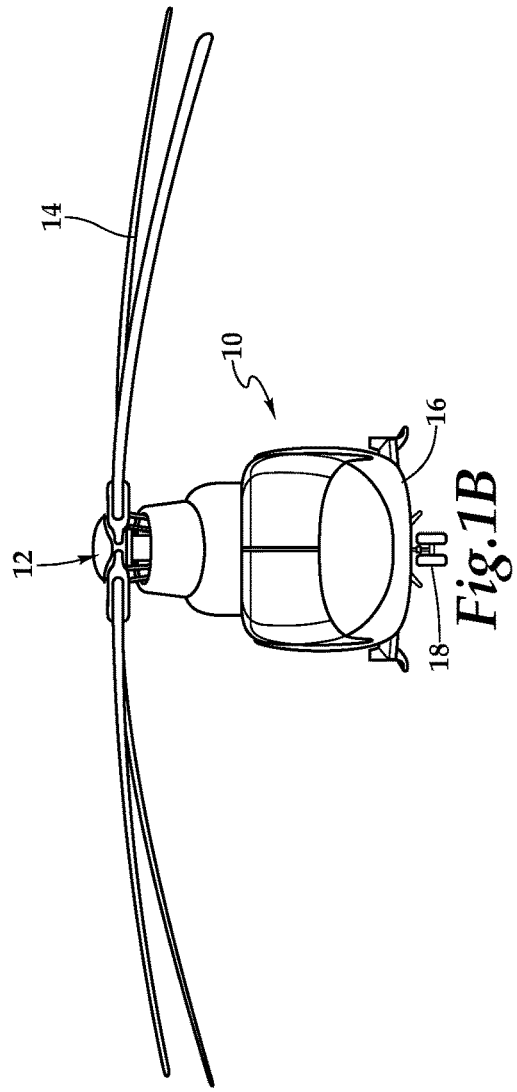

AIRCRAFT FUEL SYSTEMS

TECHNICAL FIELD OF THE DISCLOSURE

The present disclosure relates, in general, to aircraft fuel systems and, in particular, to the use of a polyurea spray coating on fuel cell cushions, fuel cells and other fuel system surfaces to prevent fuel absorption and fuel intrusion, to reduce weight, to increase stiffness, to provide flexibility and/or to enhance puncture resistance, thereby improving the overall safety of aircraft fuel systems.

BACKGROUND

The United States Federal Aviation Administration (FAA) establishes airworthiness standards for aircraft such as airplanes and rotorcraft and certifies that aircraft, aircraft engines, propellers and related articles conform to an approved design and are in a condition for safe operation. In one example, part 29 of the FAA regulations is directed to airworthiness standards for transport rotorcraft, which includes section 29.967 directed to fuel tank installation and the structural support thereof. Section 29.967 requires the fuel system to include cushions, or padding, to minimize wear, chafing or other damage to the fuel tank over the life of the rotorcraft and during a crash. Section 29.967 also requires that the cushions be nonabsorbent or treated to prevent the absorption of fuel, thus minimizing the risk of fire in case of a fuel tank leak. Current aircraft fuel system padding utilizes materials that are heavy and which require a burdensome application of sealant or wrapping to meet the nonabsorbent requirements of the FAA regulations. Accordingly, a need has arisen for fuel cell cushions meeting the strength and nonabsorbent standards for fuel cell supports, but which are lighter, easier to produce and provide other advantages.

SUMMARY

In a first aspect, the present disclosure is directed to an aircraft fuel system including a fuel cell adapted to contain fuel. A fuel cell receiving assembly has an inner surface adapted to receive the fuel cell. A shaped foam substrate is machined from a foam substrate to fit between the inner surface of the fuel cell receiving assembly and the fuel cell. A polyurea spray coating substantially covers the shaped foam substrate to form a fuel cell cushion. The polyurea spray coating is sprayable onto the shaped foam substrate such that the fuel cell cushion is substantially nonabsorbent of fuel. The fuel cell cushion is interposable between the inner surface of the fuel cell receiving assembly and the fuel cell to cushion the fuel cell from damage.

In certain embodiments, the fuel cell may be one of a plurality of fuel cells. In some embodiments, the foam substrate may be a closed cell foam such as a thermoplastic foam. In certain embodiments, the foam substrate may be a ballistic foam such as a thermoplastic foam with embedded fibers. In some embodiments, the foam substrate may have a density of between about two and about ten pounds per cubic foot. In certain embodiments, the fuel cell cushion may be one of a plurality of fuel cell cushions. In some embodiments, the polyurea spray coating may be formed from a reaction between an isocyanate component and an amine component upon spraying the polyurea spray coating on the shaped foam substrate. In certain embodiments, the polyurea spray coating may be a one hundred percent solids coating. In some embodiments, the polyurea spray coating may include a thinning agent. In certain embodiments, the polyurea spray coating may at least partially cover the fuel cell such that the fuel cell cushion may be adhered to the fuel cell by the polyurea spray coating on at least one of the fuel cell and the fuel cell cushion. In such embodiments, the polyurea spray coating may be configured to have substantial flexibility to prevent disbonding of the polyurea spray coating from the fuel cell and/or the fuel cell cushion may be coupled to the fuel cell prior to curing of the polyurea spray coating. For example, this technique may be used when the fuel cell cushion is coupled to the fuel cell as a patch to repair damage to the fuel cell.

In a second aspect, the present disclosure is directed to an aircraft that includes a fuselage and a fuel cell receiving assembly coupled to the fuselage that has an inner surface adapted to receive a fuel cell therein. The fuel cell is adapted to contain fuel. A shaped foam substrate is machined from a foam substrate to fit between the inner surface of the fuel cell receiving assembly and the fuel cell. A polyurea spray coating substantially covers the shaped foam substrate to form a fuel cell cushion. The polyurea spray coating is sprayable onto the shaped foam substrate such that the fuel cell cushion is substantially nonabsorbent of fuel. The fuel cell cushion is interposable between the inner surface of the fuel cell receiving assembly and the fuel cell to cushion the fuel cell from damage.

In a third aspect, the present disclosure is directed to a method of manufacturing an aircraft fuel system. The method includes providing a foam substrate; machining the foam substrate to fit between a fuel cell receiving assembly and a fuel cell to form a shaped foam substrate having a surface; and spraying the surface of the shaped foam substrate with a polyurea spray coating to form a fuel cell cushion, the fuel cell cushion substantially nonabsorbent of fuel, the fuel cell cushion interposable between the fuel cell receiving assembly and the fuel cell to cushion the fuel cell from damage.

The method may also include spraying a single layer of the polyurea spray coating onto the surface of the shaped foam substrate; forming a one hundred percent solids coating on the surface of the shaped foam substrate; spraying at least a portion of a surface of the fuel cell with the polyurea spray coating; adhering the fuel cell cushion to the fuel cell; and/or adhering the fuel cell cushion to the fuel cell prior to curing of the polyurea spray coating on at least one of the fuel cell and the fuel cell cushion.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1A-1B are schematic illustrations of an exemplary rotorcraft with a fuel system in accordance with embodiments of the present disclosure;

DETAILED DESCRIPTION

Figure 2A:
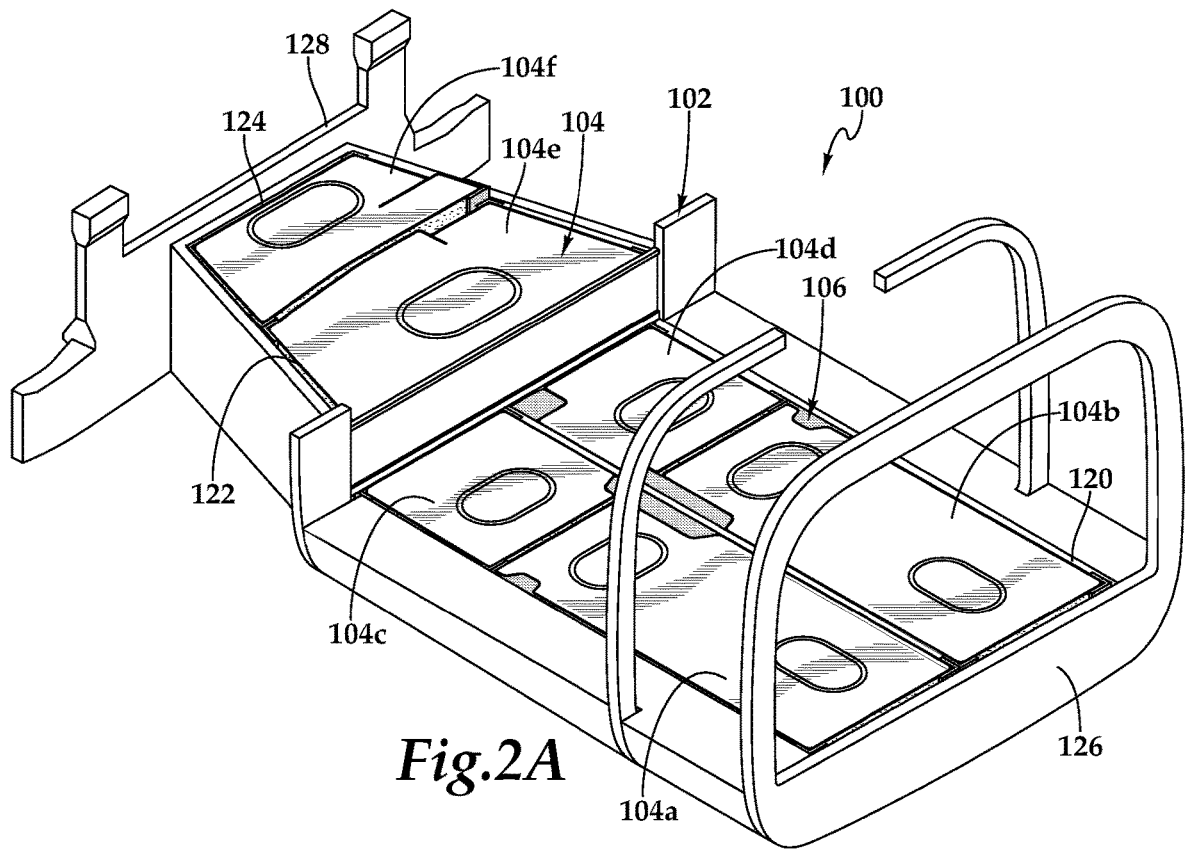
FIGS. 2A-2D are isometric views of component parts of an aircraft fuel system in accordance with embodiments of the present disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring to FIGS. 1A-1B in the drawings, a rotorcraft depicted as a helicopter is schematically illustrated and generally designated 10. Rotorcraft 10 has a main rotor assembly 12 that includes a plurality of rotor blades 14. Main rotor assembly 12 is rotatable relative to a fuselage 16 of rotorcraft 10. The pitch of rotor blades 14 can be collectively and/or cyclically manipulated to selectively control direction, thrust and lift of rotorcraft 10. A landing gear system 18 provides ground support for rotorcraft 10. A tailboom 20 extends aftwardly from fuselage 16. An anti-torque system 24 includes a tail rotor assembly 26 that is rotatably coupled to an aft portion 22 of tailboom 20.

Rotorcraft 10 has a fuel system 28 including a fuel cell receiving assembly 30 located in a lower portion of fuselage 16. Fuel cell receiving assembly 30 is coupled to fuselage 16 and may be fully or partially integral with fuselage 16 or may be independent of but secured to fuselage 16. Fuel cell receiving assembly 30 contains or receives one or more fuel cells 32 each of which contains fuel. The fuel contained in fuel cells 32 is used as an energy source to power the various systems of rotorcraft 10, such as main rotor assembly 12 and tail rotor assembly 26. One or more fuel cell cushions 34 are interposed between fuel cells 32 and the inner surface of fuel cell receiving assembly 30 to provide smooth, stable and non-damaging surfaces for fuel cells 32. Fuel cell cushions 34 prevent protruding structures, such as fasteners, or other wear items from puncturing fuel cells 32 during a crash or from wearing down or weakening fuel cells 32 over time. Fuel cell cushions 34 have a polyurea spray coating substantially covering the surface thereof to prevent the absorption of fuel by fuel cell cushions 34, thereby decreasing the risk of a fire. The polyurea spray coating provides improved hardness, flexibility, tear and tensile strength for fuel cell cushions 34 compared to prior coatings used on fuel cell cushions. Thus, fuel cell cushions 34 protect the structural integrity of fuel cells 32 while resisting the absorption of fuel.

It should be appreciated that rotorcraft 10 is merely illustrative of a variety of aircraft that can implement the embodiments disclosed herein. Indeed, fuel system 28, including fuel cell cushions 34, may be utilized on any aircraft that uses fuel as an energy source. Other aircraft implementations can include hybrid aircraft, tiltrotor aircraft, tiltwing aircraft, quad tiltrotor aircraft, unmanned aircraft, gyrocopters, airplanes, jets and the like. As such, those skilled in the art will recognize that fuel cell cushions 34 can be integrated into a variety of aircraft configurations. It should be appreciated that even though aircraft are particularly well-suited to implement the embodiments of the present disclosure, non-aircraft vehicles and devices can also implement the embodiments.

Figure 2B:
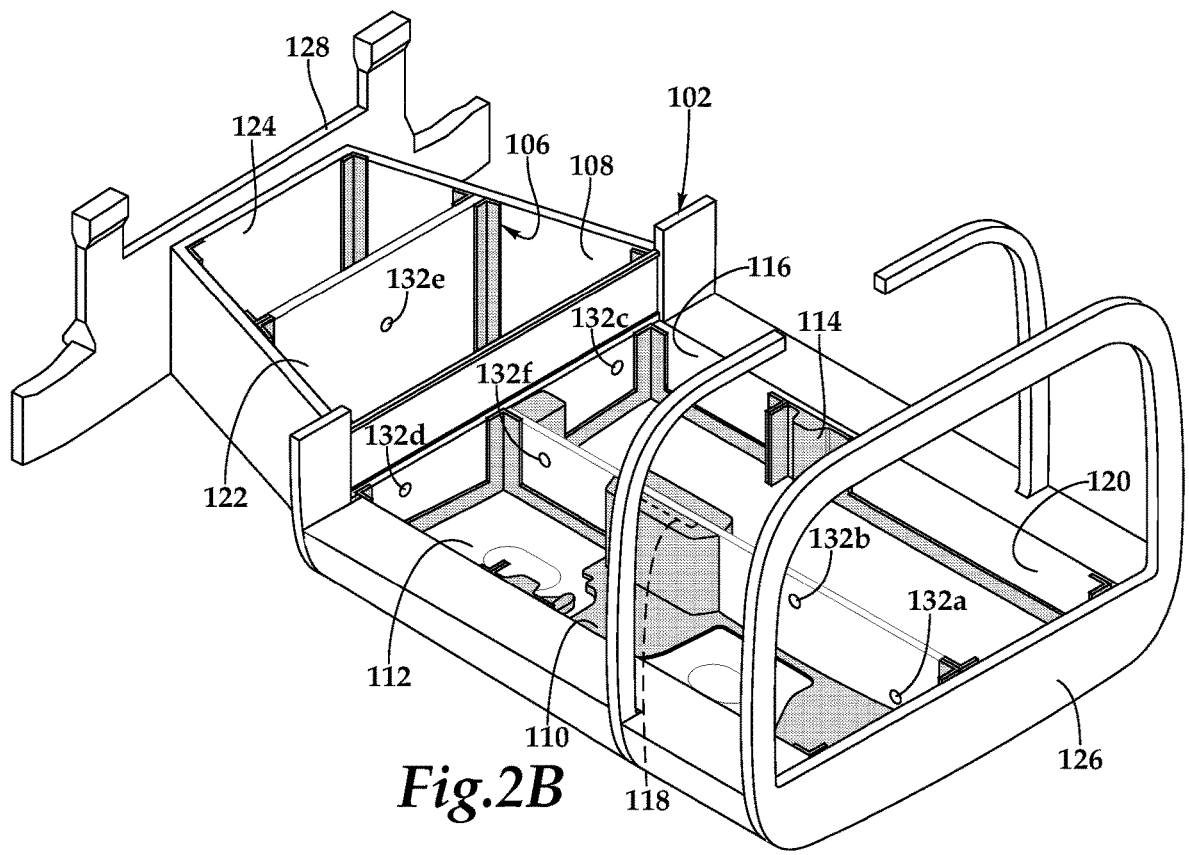
Figure 2C:
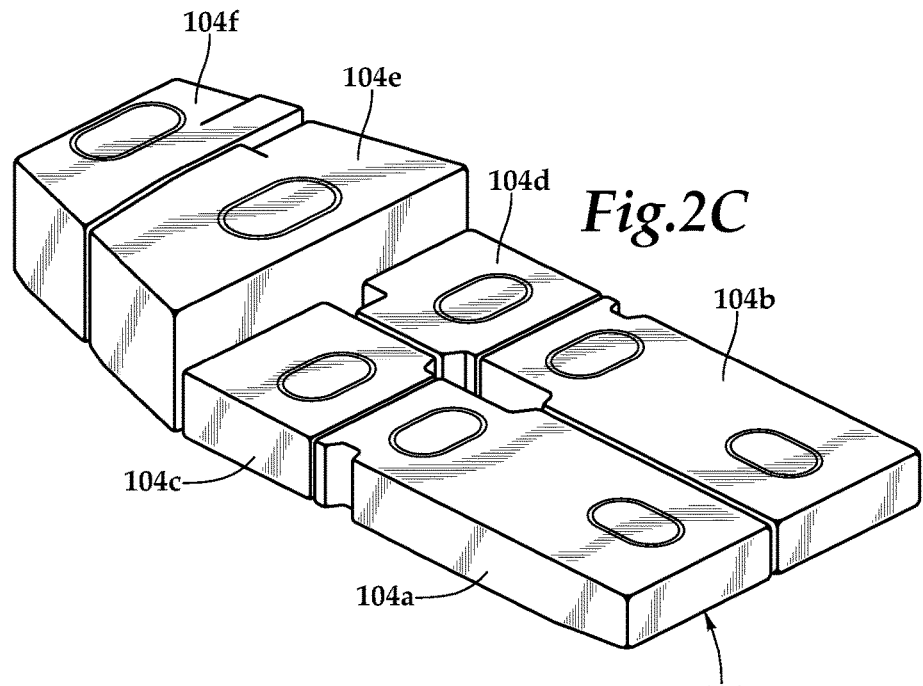

Referring to FIGS. 2A-2D in the drawings, a fuel system for an aircraft is schematically illustrated and generally designated 100. Fuel system 100 includes a fuel cell receiving assembly 102 that receives or contains fuel cells 104. Fuel cell cushions 106 are interposed between inner surface 108 of fuel cell receiving assembly 102 and fuel cells 104. Fuel cell cushions 106 include floor fuel cell cushions 110 which are disposed on a floor 112 of inner surface 108 and wall fuel cell cushions 114, which are disposed on walls 116 of inner surface 108, as best seen in FIG. 2B with fuel cells 104 removed. Fuel cell cushions 106 at least partially surround fuel cells 104 to cushion and protect fuel cells 104 from damage caused by protrusions 118 in fuel cell receiving assembly 102 and from other hazards. Fuel cell cushions 106 support the weight of fuel cells 104 to minimize the displacement of fuel cells 104 and resist fuel absorption in case of a fuel leak. Fuel cell cushions 106 may also be tapered or shaped to bias or direct the flow of fuel within fuel cells 104 in a particular direction, such as toward an outlet or fuel pump.

Fuel cell receiving assembly 102 includes multiple compartments, including a forward compartment 120, a middle compartment 122 and an aft compartment 124. Fuel cell receiving assembly 102, including floor 112, walls 116, bulkheads 126, 128 and any supporting airframe structure, may be formed from a metal, such as aluminum, composite or other suitable material. It should be understood by those of ordinary skill in the art that fuel cell receiving assembly 102 may be constructed in any number of different manners including, but not limited to, as a single unitary assembly, as multiple unitary subassemblies such as a front subassembly, a middle subassembly and an aft subassembly, or in another suitable manner. Likewise, portions of fuel cell receiving assembly 102 could alternatively be formed by sections of keel beams connected to or integral with the fuselage of an aircraft, such as a pair of side keel beams and a central keel beam each of which extend in the longitudinal direction of fuel cell receiving assembly 102. Regardless of the specific manner of construction, important features of fuel cell receiving assembly 102 include being sized and shaped to operably receive and contain fuel cells 104 therein.

In the illustrated embodiment, fuel cells 104 include six interconnected fuel cells including forward cells 104a, 104b, feed cells 104c, 104d, mid cell 104e and aft cell 104f. As illustrated, the height of mid cell 104e and aft cell 104f is greater than that of forward cells 104a, 104b and feed cells 104c, 104d. The volume of fuel that may be stored in fuel cells 104 will depend on the particular implementation but will typically be on the order of several hundred to a thousand gallons. Compartments 120, 122, 124 of fuel cell receiving assembly 102 are each adapted to receive at least one of fuel cells 104. As illustrated, forward compartment 120 of fuel cell receiving assembly 102 receives forward cells 104a, 104b and feed cells 104c, 104d, middle compartment 122 of fuel cell receiving assembly 102 receives mid cell 104e and aft compartment 124 receives aft cell 104f. Even though fuel cells 104 have been described as having a particular number of fuel cells in a particular configuration, it should be understood by those of ordinary skill in the art that fuel cells 104 may have any number of fuel cells both less than or greater than six and fuel cells 104 may be arranged in any manner of different configurations depending upon the particular implementation. Likewise, fuel cell receiving assembly 102 may include any number of compartments to receive fuel cells 104.

Figure 2D:
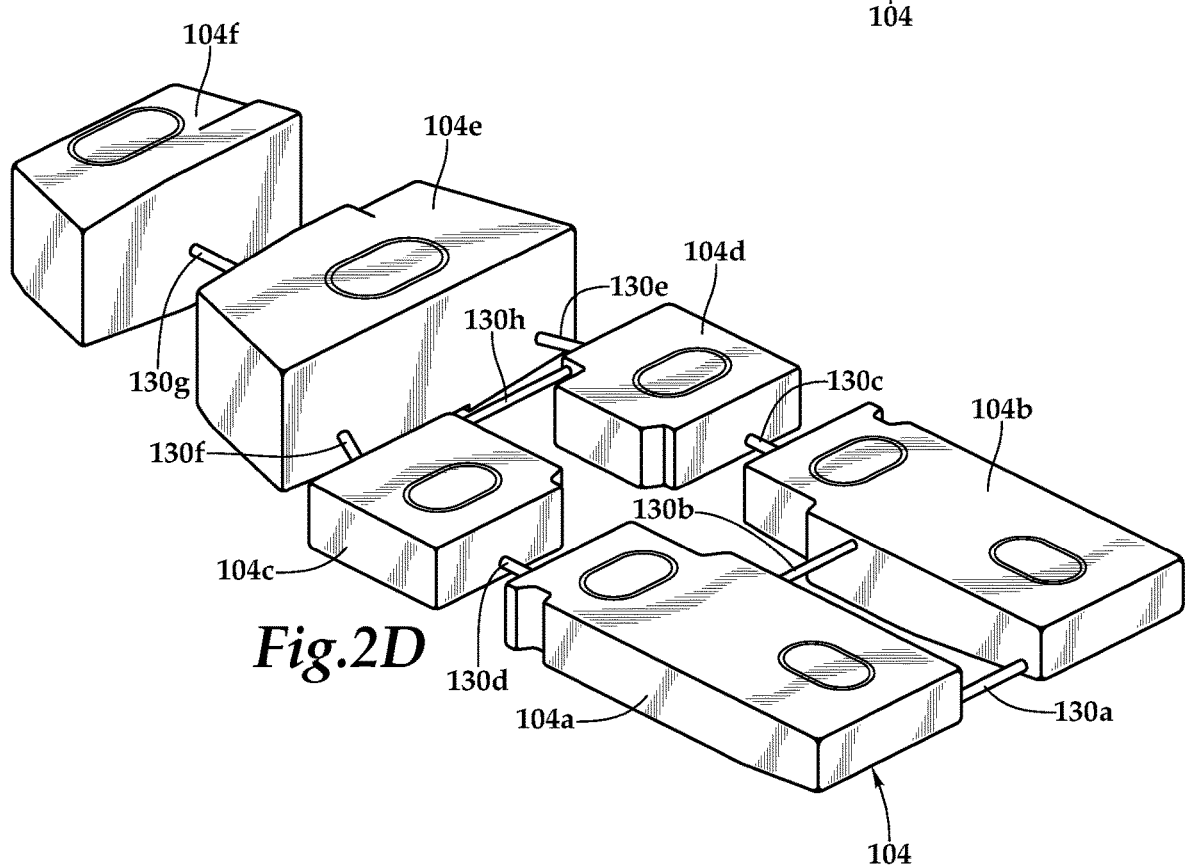

As best seen in the exploded view of FIG. 2D, fuel cells 104 include one or more fluid interconnection lines 130a-130h, each of which may be coupled to any two of fuel cells 104 to provide fluid communication therebetween. As illustrated, two fluid interconnection lines 130a, 130b establish fluid communication between forward cells 104a, 104b. Preferably, fluid interconnection line 130a is operable to communicate a liquid, such as fuel, between forward cells 104a, 104b while fluid interconnection line 130b is a vent line operable to communicate a gas, such as air, between forward cells 104a, 104b. Also illustrated is fluid interconnection line 130c that establishes fluid communication between forward cell 104b and feed cell 104d, fluid interconnection line 130d that establishes fluid communication between forward cell 104a and feed cell 104c, fluid interconnection line 130e that establishes fluid communication between feed cell 104d and mid cell 104e, fluid interconnection line 130f that establishes fluid communication between feed cell 104c and mid cell 104e, fluid interconnection line 130g that establishes fluid communication between mid cell 104e and aft cell 104f and fluid interconnection line 130h that establishes fluid communication between feed cell 104c and feed cell 104d. Fluid interconnection lines 130c, 130d, 130e, 130f, 130g are preferably operable to communicate liquids while fluid interconnection line 130h is preferably a vent line operable to communicate a gas.

Some of fluid interconnection lines 130a-130h pass through apertures 132a-132f formed by walls 116 of fuel cell receiving assembly 102. As illustrated, fluid interconnection line 130a passes through aperture 132a, fluid interconnection line 130b passes through aperture 132b, fluid interconnection line 130e passes through aperture 132c, fluid interconnection line 130f passes through aperture 132d, fluid interconnection line 130g passes through aperture 132e and fluid interconnection line 130h passes through aperture 132f. During a crash impact or otherwise, none of fluid interconnection lines 130a-130h can become severed or separated from fuel cells 104 as this could result in fuel exiting fuel cells 104 and potentially igniting. Fuel cells 104 are preferably rigid or semi-rigid fuel cells formed from a composite material such as a carbon fiber composite, a fiberglass composite or other ballistic material such as Kevlar, among other materials.

FIGS. 3A-3D illustrate the various stages and materials used in the formation of a fuel cell cushion 106. The manufacture of each fuel cell cushion 106 may begin with a foam substrate 134. Foam substrate 134 is formed from closed cell foam with adequate compression strength to withstand the loading of fuel cells 104 in flight. Foam substrate 134 may be blown to create the porosity therein. Foam substrate 134 may be a fine cell compressible material that is capable of being machined into any shape or thickness. For example, foam substrate 134 may be formed from a thermoplastic such as polyvinyl chloride, polyethylene, polyurethane, polyolefin, polymethacrylimide or other suitable material. Foam substrate 134 may be a ballistic foam such as a thermoplastic foam having embedded fibers including polyurethane foam with chopped fiberglass strands embedded therein. Depending upon the specific implementation, foam substrate 134 may have a compression strength of between about 300 and about 500 pounds per square inch and preferably about 400 pounds per square inch when used as floor fuel cell cushions 110 or a compression strength of between about 10 and about 40 pounds per square inch and preferably about 20 pounds per square inch, when used as wall fuel cell cushions 114. Foam substrate 134, however, may have any suitable compression strength either higher than, lower than or between the enumerated compression strengths depending on the application, taking into account such factors as the size and weight of fuel cells 104. In one example, foam substrate 134 may have a density of between about two and about ten pounds per cubic foot. Foam substrate 134, however, may also have a density of less than two pounds per cubic foot or greater than ten pounds per cubic foot based on the application, taking into account such factors as the size and weight of fuel cells 104.

Figure 3A:
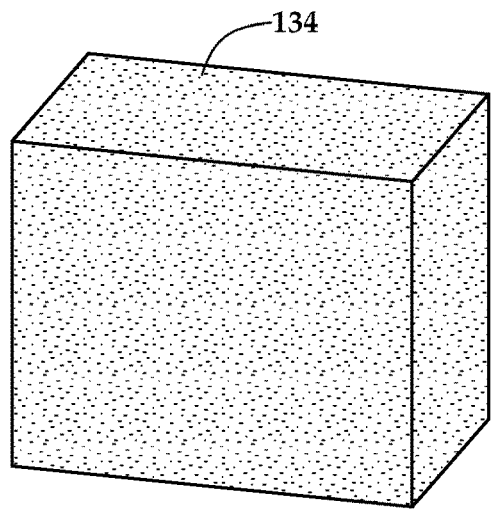
FIGS. 3A-3D are views of a fuel cell cushion during various manufacturing stages in accordance with embodiments of the present disclosure.
Figure 3B:
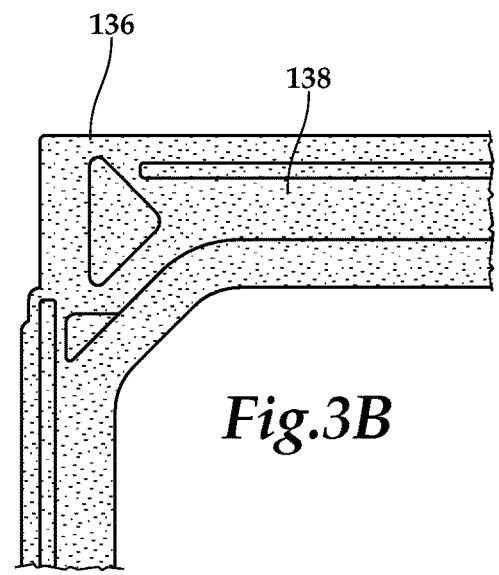

Foam substrate 134 is machined to fit between inner surface 108 of fuel cell receiving assembly 102 and fuel cells 104 to form a shaped foam substrate 136, as shown in FIG. 3B. Shaped foam substrate 136 may be machined to any shape or thickness. It will be appreciated by one of ordinary skill in the art that the tools used to machine foam substrate 134 into shaped foam substrate 136 are numerous, and may include a band saw, groove bits, milling tools, a computer numerical control, or CNC, machine or other machining devices. After being machined, shaped foam substrate 136 preferably has smooth surfaces 138 on which a coating may be applied.

Figure 3C:
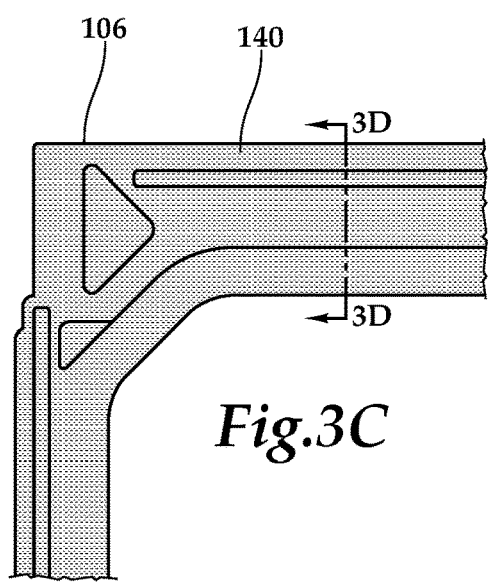
Figure 3D:
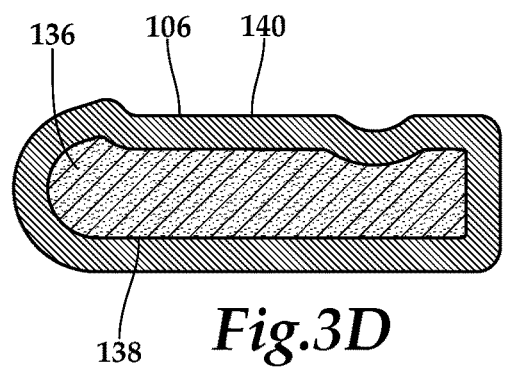

A polyurea spray coating 140 substantially covers shaped foam substrate 136 to form fuel cell cushion 106 as shown in FIGS. 3C-3D. Polyurea spray coating 140 is a polymer coating formed by reacting an isocyanate monomer, prepolymer, polymer or a blend thereof such as a diisocyanate or a polyisocyanate with an amine such as a diamine, a polyamine or other amine blend. Mixing of the isocyanate component and the amine component is accomplished in the spray head during the spraying process as polyurea spray coating 140 has a fast gel time, the elapsed time from the moment the isocyanate and amine components are mixed to the point when the reacting mass becomes a viscous, non-flowing, semi-solid. The resulting polyurea spray coating 140 has a combination of high elasticity and high surface hardness, resulting in superior puncture and abrasion resistance. The gel time of polyurea spray coating 140 may be controlled by the selection of the isocyanate component and/or the amine component. Alternatively or additionally, the gel time of polyurea spray coating 140 may be controlled by adding a thinning agent to, for example, the isocyanate component such as xylene, toluene, ketone or other suitable thinning agent.

Polyurea spray coating 140 may be sprayed onto shaped foam substrate 136 in the desired thickness in a single spray application. In one example, polyurea spray coating 140 is a one hundred percent solids polyurea spray coating that has the same thickness when the coating is applied and when the coating dries. More specifically, a coating typically has two thickness, a wet film thickness, measured before the coating has dried, and a dry film thickness, measured after the coating has dried. The percent solid refers to the percentage of coating thickness that remains after it has finished drying, or the difference between the wet and dry film thicknesses. With prior cushion coatings, such as polyurethanes coatings, a percentage of solid is lost during the drying process as the solvent component evaporates, thereby reducing the thickness. To compensate for this loss of thickness with polyurethane coatings, additional coats must be applied until the desired dry film thickness can be achieved. For example, if the desired dry film thickness is 20 mils, a fifty percent solids polyurethane coating would require two coats of 20 mils each to achieve the desired 20 mils dry film thickness. Not only does it take additional time and materials to apply multiple coats, the evaporating solvents release volatile organic compounds (VOCs) into the atmosphere that can create dangerous environments in confined spaces and health hazards for workers. This is not the case with a one hundred percent solids spray coating such as polyurea spray coating 140. Not only does polyurea spray coating 140 release no VOCs, but as a one hundred percent solids spray coating, fewer coats are required to achieve the desired dry film thickness, resulting in less materials and less labor to apply.

The application of polyurea spray coating 140 on shaped foam substrate 136 results in fuel cell cushions 106 that are substantially nonabsorbent of fuel. In addition, the use of polyurea spray coating 140 provides improved hardness, flexibility, tear and tensile strength for fuel cell cushions 106 compared to fuel cell cushions with prior coatings, such as polyurethane coatings. Thus, fuel cell cushions 106 have improved puncture and abrasion resistance compared to prior fuel cell cushions. An unexpected result for fuel cell cushions 106 with polyurea spray coatings 140 has been discovered. Specifically, the fuel tank airworthiness standards in the FAA regulations may now be met using thinner and thus lighter shaped foam substrates 136 compared to fuel cell cushions with prior coatings. For example, fuel cell cushions 106 with thinner shaped foam substrates 136, when used as floor fuel cell cushions 110, provide suitable structural support to prevent the displacement of fuel cells 104 which in turn prevents fluid interconnection lines 130*a*-130*h* from becoming compromised, which might otherwise occur if fluid interconnection lines 130*a*-130*h* experience a large displacement.

FIG. 3D shows a cross sectional view of fuel cell cushion 106. As illustrated, shaped foam substrate 136 is substantially covered with polyurea spray coating 140 which has been applied in a single spray application. Polyurea spray coating 140 substantially fills the open cells on surface 138 of shaped foam substrate 136 to provide a smooth lightweight finish. In some embodiments, polyurea spray coating 140 may have a thickness of about 15 to about 30 mils to meet fuel resistance, design strength and energy absorption criteria. In other embodiments, polyurea spray coating 140 may have thicknesses greater than 30 mils or less than 15 mils. In addition, the thickness of polyurea spray coating 140 may be nonuniform from one fuel cell cushion 106 to another or even in different areas of a single fuel cell cushion 106.

Figure 4A:
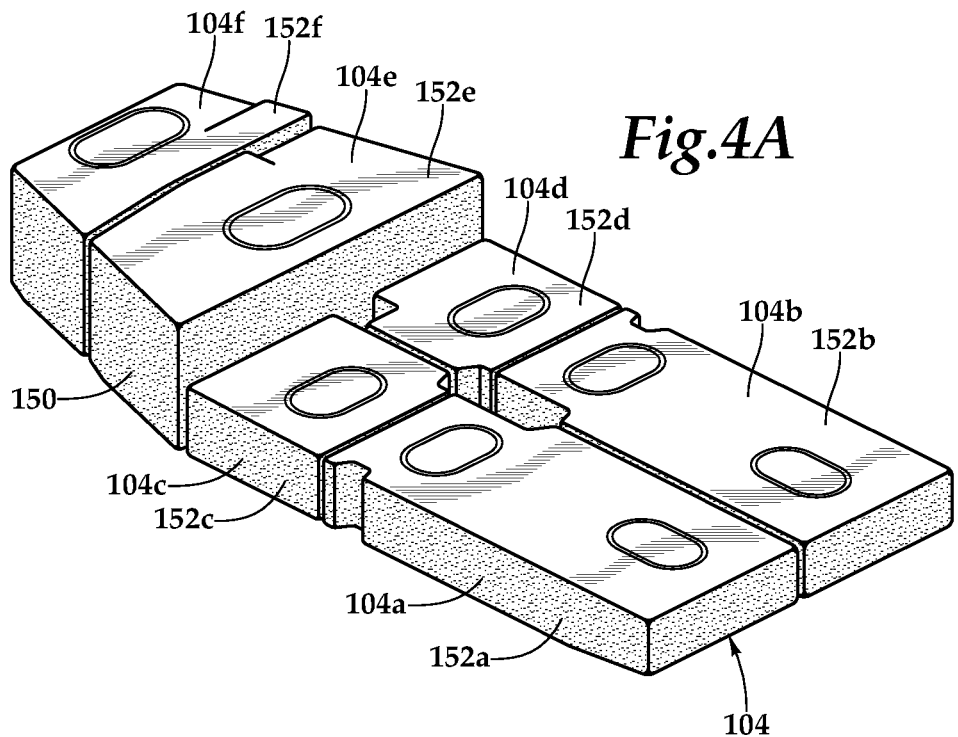
FIGS. 4A-4B are isometric views of a fuel cell assembly during various manufacturing stages in accordance with embodiments of the present disclosure.
Figure 4B:
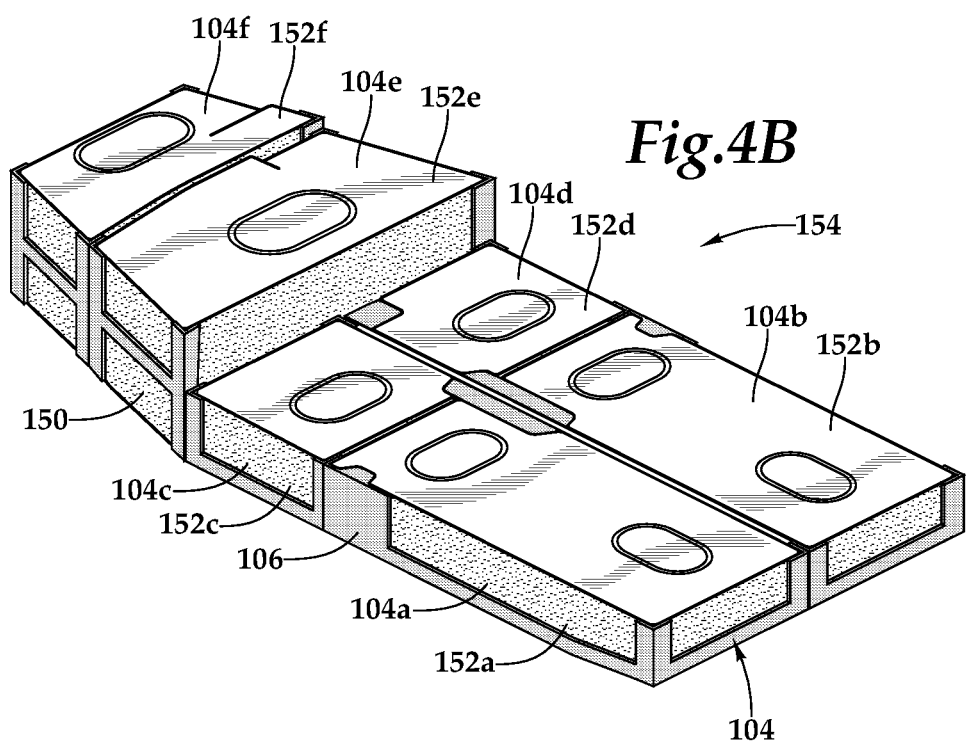

Referring additionally to FIGS. 4A-4B of the drawings, additional manufacturing steps of a fuel cell assembly are depicted. In the illustrated embodiment, the lower surface and the perimeter of each fuel cell 104*a*-104*f* have a polyurea spray coating 150 applied thereon in the desired thickness in a single spray application to form coated fuel cells 152*a*-152*f*. Depending upon the material that forms fuel cells 104*a*-104*f*, polyurea spray coating 150 may enhance the stiffness and/or puncture resistance of fuel cells 104*a*-104*f*. It is noted that, polyurea spray coating 150 is configured to have substantial flexibility which prevents disbonding of polyurea spray coating 150 from fuel cells 104*a*-104*f*. In addition, the use of polyurea spray coating 150 on fuel cells 104*a*-104*f* enables fuel cell cushions 106 to be bonded to or directed adhered to coated fuel cells 152*a*-152*f* without the need for additional sealants, adhesives or coatings, which tend to add undesired weight to the fuel system. Adhering fuel cell cushions 106 to coated fuel cells 152*a*-152*f* forms a fuel cell assembly 154 having enhanced stiffness. During assembly, fuel cell cushions 106 are coupled to coated fuel cells 152*a*-152*f* prior to the curing of at least one of polyurea spray coating 150 of coated fuel cells 152*a*-152*f*, polyurea spray coating 140 of fuel cell cushions 106 or both. In other embodiments, polyurea spray coating 150 may be sprayed on fuel cells 104*a*-104*f* in selected areas to enable the adhesion of fuel cell cushions 106 in such selected areas without spraying the entire lower surface or perimeter of each fuel cell 104*a*-104*f*. Also, polyurea spray coating 150 may be sprayed on an area of a fuel cell 104 that has been damaged or punctured such that a fuel cell cushion 106 may be adhered thereto to form a patch over the damaged area enabling at least temporary use of such a repaired fuel cell.

Figure 5:
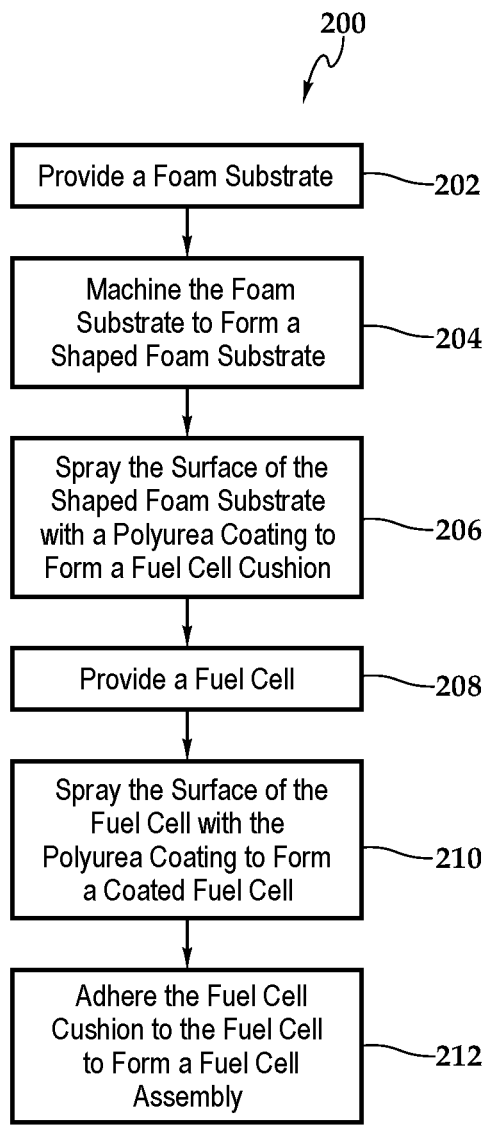
FIG. 5 is a flowchart of a method of manufacturing a fuel cell assembly for an aircraft fuel system in accordance with embodiments of the present disclosure.

Referring to FIG. 5 in the drawings, a method of manufacturing an aircraft fuel system is illustrated as flowchart 200. The method begins with providing a foam substrate in step 202. The method includes machining the foam substrate to fit between a fuel cell receiving assembly and a fuel cell to form a shaped foam substrate having a surface in step 204. The method also includes spraying the surface of the shaped foam substrate with a polyurea coating to form a fuel cell cushion in step 206. The method continues with providing a fuel cell in step 208 that has at least a portion of its surface sprayed with a polyurea coating to form a coated fuel cell in step 210. The fuel cell cushion from step 206 is then adhered to the coated fuel cell from step 210 prior to the curing of either the polyurea coating of fuel cell cushion, the polyurea coating of the coated fuel cell or both in step 212.

Figure 6B:
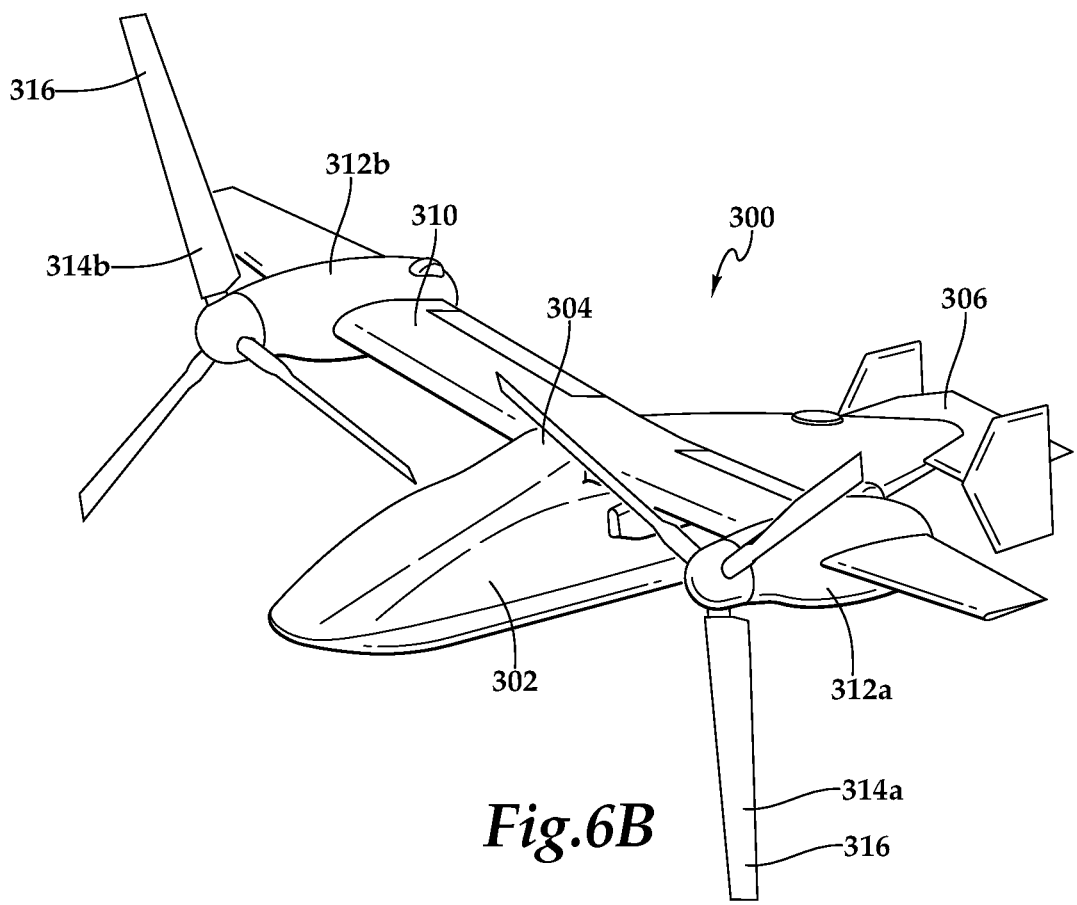
FIGS. 6A-6B are schematic illustrations of an exemplary unmanned aircraft with a wet wing in accordance with embodiments of the present disclosure.
Figure 6A:
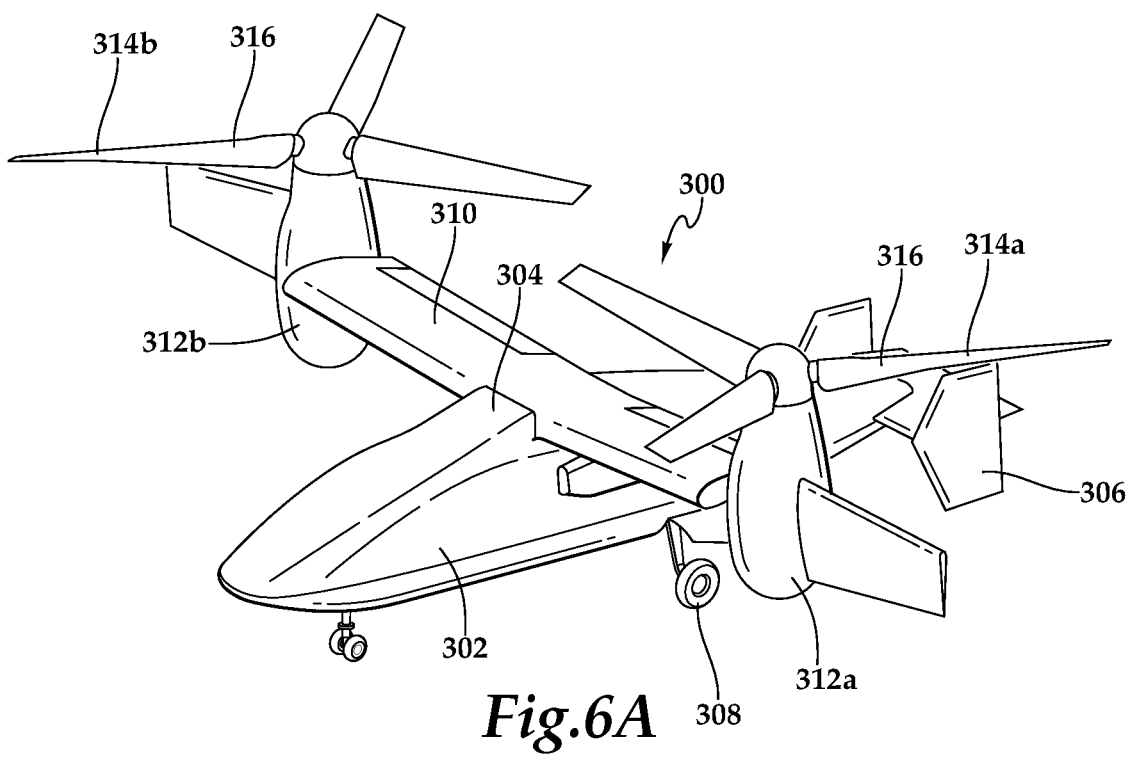

Referring next to FIGS. 6A-6B in the drawings, an unmanned aircraft system depicted as a tiltrotor aircraft is schematically illustrated and generally designated 300. Tiltrotor aircraft 300 includes a fuselage 302, a wing mount assembly 304 and a tail assembly 306. In the illustrated embodiment, tail assembly 306 includes control surfaces operable for horizontal and/or vertical stabilization during flight. A landing gear system 308 provides ground support for tiltrotor aircraft 300. A wing assembly 310 is supported by fuselage 302 and wing mount assembly 304. Coupled to outboard ends of wing assembly 310 are pylon assemblies 312a, 312b. Pylon assembly 312a is rotatable relative to wing assembly 310 between a generally vertical orientation, as best seen in FIG. 6A, and a generally horizontal orientation, as best seen in FIG. 6B. Likewise, pylon assembly 312b is rotatable relative to wing assembly 310 between a generally vertical orientation, as best seen in FIG. 6A, and a generally horizontal orientation, as best seen in FIG. 6B. In the illustrated embodiment, each pylon assembly 312a, 312b houses a drive system including, for example, an internal combustion engine and a transmission, for supplying torque and rotational energy to a respective proprotor assembly 314a, 314b. In other embodiments, at least a portion of the drive systems may be housed in fuselage 302 and routed to each of pylon assembly 312a, 312b via wing assembly 310. In the illustrated embodiment, proprotor assemblies 314a, 314b each include three proprotor blade assemblies 316. In other embodiments, proprotor assemblies 314a, 314b could alternatively have a different number of proprotor blade assemblies, either less than or greater than three. During flight operations, the position of pylon assemblies 312a, 312b, the angular velocity or revolutions per minute (RPM) of proprotor assemblies 314a, 314b, the pitch of proprotor blade assemblies 316 and the like are controlled by the flight control system to selectively control the direction, thrust and lift of tiltrotor aircraft 300.

FIG. 6A illustrates tiltrotor aircraft 300 in a vertical takeoff and landing (VTOL) flight mode or helicopter flight mode, in which proprotor assemblies 314a, 314b are positioned to rotate in a substantially horizontal plane and provide a vertical thrust such that tiltrotor aircraft 300 flies much like a conventional helicopter. FIG. 6B illustrates tiltrotor aircraft 300 in a forward flight mode or airplane flight mode, in which proprotor assemblies 314a, 314b are positioned to rotate in a substantially vertical plane and provide a forward thrust while a lifting force is supplied by wing assembly 310 such that tiltrotor aircraft 300 flies much like a conventional propeller driven aircraft. During operation, tiltrotor aircraft 300 may convert from helicopter flight mode to airplane flight mode following vertical takeoff and/or hover. Likewise, tiltrotor aircraft 300 may convert back to helicopter flight mode from airplane flight mode for hover and/or vertical landing. In addition, tiltrotor aircraft 300 can perform certain flight maneuvers with proprotor assemblies 314a, 314b positioned between airplane flight mode and helicopter flight mode, which can be referred to as conversion flight mode. Unmanned tiltrotor aircraft 300 may be used in military applications such as intelligence, surveillance, reconnaissance and attack missions. Unmanned tiltrotor aircraft 300 may be networked together with similar aircraft enabling cooperation with one another including, for example, exhibiting swarm behavior such as the ability to dynamically adapt to changing conditions, group coordination, distributed control, distributed tactical group planning, distributed tactical group goals, distributed strategic group goals and/or fully autonomous swarming.

Figure 7A:
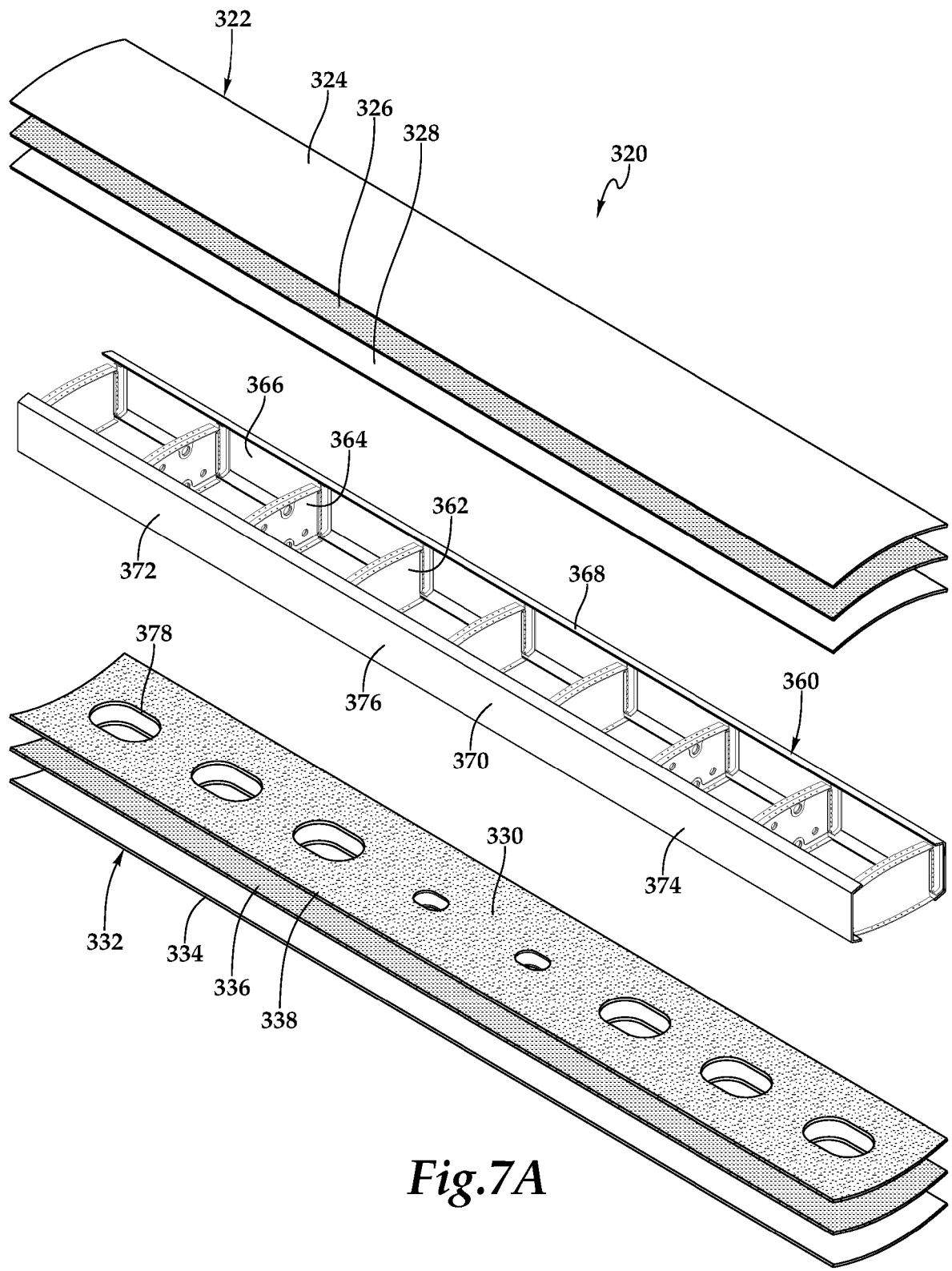
FIGS. 7A-7C are various views of components for a wet wing in accordance with embodiments of the present disclosure.

In the illustrated embodiment, wing assembly 310 is a wet wing that is configured to contain liquid fuel for the engine or engines of tiltrotor aircraft 300. Referring additionally to FIG. 7A, a portion of a wing airframe assembly 320 is depicted. Wing airframe assembly 320 includes an upper core stiffened wing skin assemblies 322 that is formed from an outer skin 324, a honeycomb core 326 and an inner skin 328, wherein honeycomb core 326 is sandwiched between outer skin 324 and inner skin 328. Wing airframe assembly 320 also includes a lower core stiffened wing skin assemblies 332 that is formed from an outer skin 334, a honeycomb core 336 and an inner skin 338, wherein honeycomb core 336 is sandwiched between outer skin 334 and inner skin 338. The honeycomb cores interposed between outer and inner skins provide structural stiffness which prevents the core stiffened wing skin assemblies from buckling during normal operation. In addition, the use of honeycomb cores 326, 336 to form upper and lower core stiffened wing skin assemblies 322, 332 advantageously provides narrow profiles for the upper and lower core stiffened wing skin assemblies 322, 332 that do not include or require any conventional stringers, thereby providing improved fuel bay clearance. In addition, the use of honeycomb cores 326, 336 to form upper and lower core stiffened wing skin assemblies 322, 332 improves the strength of the torque box structure including improved stiffness and torsional support during the shearing motion produced by propulsion assemblies 314a, 314b.

Outer skins 324, 334 and inner skins 328, 338 may be formed from composite materials that may include numerous material plies composed of continuous filaments or fibers including one or more of glass, carbon, graphite, basalt, aromatic polyamide materials or the like and any combination thereof. The material plies may be in the form of fabrics such as woven fabrics, tape such as unidirectional tape and the like. The plies may be joined together with a resin such as a polymeric matrix including thermoplastic or thermosetting resin or any suitable resin system. In the illustrated embodiment, the upper surface of inner skin 338 and the lower surface of inner skin 328 (not visible) have been coated with a polyurea spray coating 330 that provides a barrier against fluid intrusion, in this case fuel intrusion, that could otherwise come into contact with honeycomb cores 326, 336 potentially causing a loss of strength or integrity thereof and allowing the cell walls of honeycomb cores 326, 336 to become compromised.

Figure 7B:
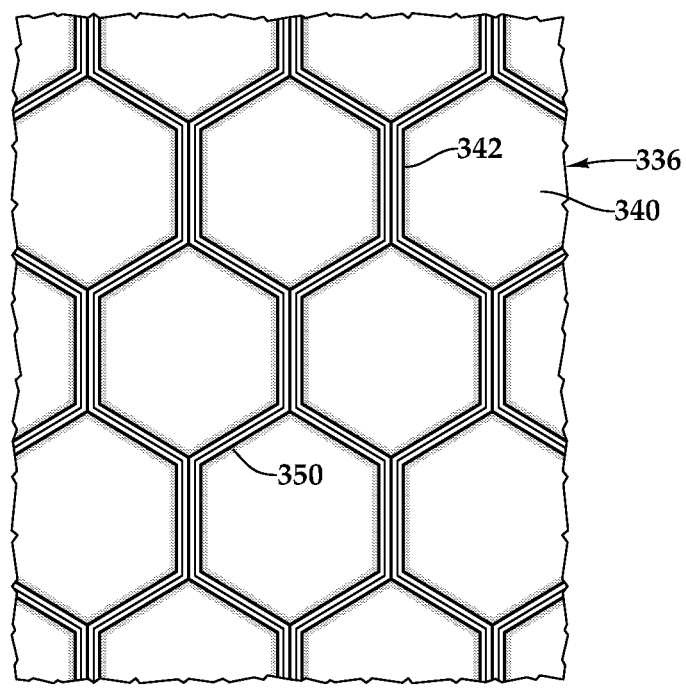
Figure 7C:
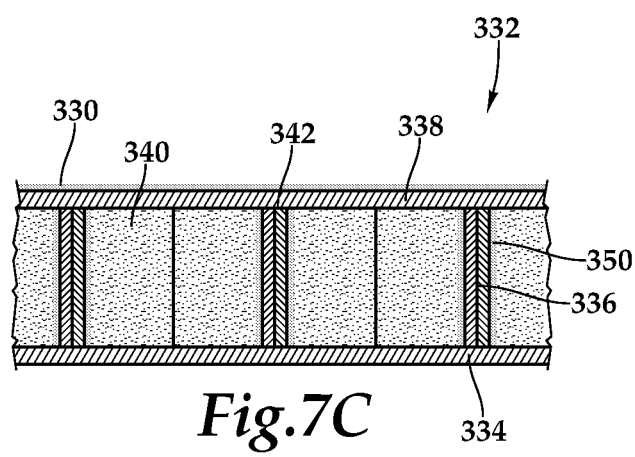

Honeycomb cores 326, 336 may be formed from a variety of materials, including but not limited to, composite materials, papers, thermoplastics, carbon fiber, metals or combinations thereof. As best seen in FIGS. 7B-7C, honeycomb core 336 includes an array of cells 340 having interconnected cell walls 342. Honeycomb core 336 is substantially similar to honeycomb core 326 therefore, for sake of efficiency, certain features will be disclosed only with regard to honeycomb core 336. One having ordinary skill in the art, however, will fully appreciate an understanding of honeycomb core 326 based upon the disclosure herein of honeycomb core 336. Cells 340 of honeycomb core 336 may take the form of hexagonal cells (as illustrated), rectangular cells, square cells, flex-core cells, reinforced cells or the like. In the illustrated embodiment, the surfaces of honeycomb core 336 have been coated with a polyurea spray coating 350 that not only increases the stiffness of honeycomb core 336 but also prevents fluid, in this case fuel, from coming in contact with the material of honeycomb core 336 and/or prevents fluid migration from one cell to another in the event that fluid infiltrates into one of the cells 340 of honeycomb core 336. In some implementations, polyurea spray coating 350 may be used to adhere honeycomb core 336 to outer skin 334 and inner skin 338 without the need for an addition film adhesive. Alternatively or additionally, the contact surfaces of outer skin 334 and inner skin 338 may have a polyurea spray coating applied thereto to aid in the adhesion between honeycomb core 336, outer skin 334 and inner skin 338.

Disposed between upper core stiffened wing skin assemblies 322 and lower core stiffened wing skin assemblies 332 is a wing airframe core assembly 360 that includes a plurality of ribs 362 and a plurality of baffles 364 that are spaced spanwise along wing airframe assembly 320 to form a plurality of fuel bays 366 therein. Wing airframe core assembly 360 also includes spars 368, 370. Upper core stiffened wing skin assembly 322, lower core stiffened wing skin assembly 332 and wing airframe core assembly 360 are coupled to one another to form a torque box structure, which may be joined together by adhesive bonding or using aerospace fasteners such as pins, screws, rivets or other suitable fastening techniques to form the torque box structure. When fully assembled, wing airframe assembly 320 includes a left outboard section 372, a right outboard section 374 and a midwing section 376. Midwing section 376 is located above fuselage 302 and is interposed between left and right outboard sections 372, 374. Left and right outboard sections 372, 374 are generally outboard of fuselage 302 and are the wet wing portions of wing assembly 310. In the illustrated embodiment, lower core stiffened wing skin assembly 332 forms access holes 378 spaced spanwise across wing assembly 310. Access holes 378 serve as fuel access holes for fuel bays 366. It will be appreciated by one of ordinary skill in the art that although a particular number of access holes 378 and fuel bays 366 have been illustrated, a wet wing of an aircraft could have any suitable number of access holes or fuel bays.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft fuel system comprising:
a wet wing including a honeycomb core formed from an array of cells having interconnected cell walls;
a fuel cell adapted to contain fuel;
a fuel cell receiving assembly having an inner surface adapted to receive the fuel cell;
a shaped foam substrate machined from a foam substrate to fit between the inner surface of the fuel cell receiving assembly and the fuel cell;
a polyurea spray coating substantially covering the shaped foam substrate to form a fuel cell cushion, the polyurea spray coating sprayable onto the shaped foam substrate such that the fuel cell cushion is substantially nonabsorbent of fuel, the fuel cell cushion adhered directly to the fuel cell by the polyurea spray coating, the fuel cell cushion interposable between the inner surface of the fuel cell receiving assembly and the fuel cell to cushion the fuel cell from damage; and
a polyurea coating substantially covering the interconnected cell walls of the cells.

2. The aircraft fuel system as recited in claim 1 wherein the foam substrate comprises a thermoplastic foam.

3. The aircraft fuel system as recited in claim 1 wherein the foam substrate comprises a ballistic foam.

4. The aircraft fuel system as recited in claim 1 wherein the foam substrate comprises a thermoplastic foam with embedded fibers.

5. The aircraft fuel system as recited in claim 1 wherein the foam substrate has a density of between about two and about ten pounds per cubic foot.

6. The aircraft fuel system as recited in claim 1 wherein the polyurea spray coating comprises a reaction between an isocyanate component and an amine component upon spraying the polyurea spray coating on the shaped foam substrate.

7. The aircraft fuel system as recited in claim 1 wherein the polyurea spray coating comprises a one hundred percent solids coating.

8. The aircraft fuel system as recited in claim 1 wherein the polyurea spray coating further comprises a thinning agent.

9. The aircraft fuel system as recited in claim 1 wherein the polyurea spray coating at least partially covers the fuel cell, the polyurea spray coating configured to have substantial flexibility to prevent disbonding of the polyurea spray coating from the fuel cell; and
wherein, the fuel cell cushion is adhered directly to the fuel cell by the polyurea spray coating on at least one of the fuel cell and the fuel cell cushion.

10. The aircraft fuel system as recited in claim 9 wherein the fuel cell cushion is coupled to the fuel cell prior to curing of the polyurea spray coating.

11. The aircraft fuel system as recited in claim 9 wherein the fuel cell cushion is coupled to the fuel cell as a patch to repair damage to the fuel cell.

12. The aircraft fuel system as recited in claim 1 wherein the fuel cell cushion is adhered directly to the fuel cell solely by a coating consisting of the polyurea spray coating.

13. An aircraft comprising:
a fuselage;
a fuel cell receiving assembly and a wet wing coupled to the fuselage, the fuel cell receiving assembly having an inner surface, the wet wing including a honeycomb core formed from an array of cells having interconnected cell walls;
a fuel cell adapted to contain fuel, the fuel cell receiving assembly adapted to receive the fuel cell;
a shaped foam substrate machined from a foam substrate to fit between the inner surface of the fuel cell receiving assembly and the fuel cell;
a polyurea spray coating substantially covering the shaped foam substrate to form a fuel cell cushion, the polyurea spray coating sprayable onto the shaped foam substrate such that the fuel cell cushion is substantially nonabsorbent of fuel, the fuel cell cushion adhered directly to the fuel cell by the polyurea spray coating, the fuel cell cushion interposable between the inner surface of the fuel cell receiving assembly and the fuel cell to cushion the fuel cell from damage; and
a polyurea coating substantially covering the interconnected cell walls of the cells.

14. The aircraft as recited in claim 13 wherein the wet wing further comprises:
a wing airframe core assembly having a top side and a bottom side;
an upper core stiffened wing skin assembly coupled to the top side of the wing airframe core assembly; and
a lower core stiffened wing skin assembly coupled to the bottom side of the wing airframe core assembly, at least one of the upper core stiffened wing skin assembly or the lower core stiffened wing skin assembly including the honeycomb core.

15. The aircraft as recited in claim 14 wherein the honeycomb core comprises an upper honeycomb core and a lower honeycomb core;
   wherein, the upper core stiffened wing skin assembly further comprises an outer skin and an inner skin sandwiching the upper honeycomb core, a lower surface of the inner skin of the upper core stiffened wing skin assembly at least partially coated with the polyurea spray coating; and
   wherein, the lower core stiffened wing skin assembly further comprises an outer skin and an inner skin sandwiching the lower honeycomb core, an upper surface of the inner skin of the lower core stiffened wing skin assembly at least partially coated with the polyurea spray coating.

16. A method of manufacturing an aircraft fuel system comprising:
   providing a foam substrate;
   providing a wet wing including a honeycomb core formed from an array of cells having interconnected cell walls;
   applying a polyurea coating to the interconnected cell walls of the cells;
   machining the foam substrate to fit between a fuel cell receiving assembly and a fuel cell to form a shaped foam substrate having a surface;
   spraying the surface of the shaped foam substrate with a polyurea spray coating to form a fuel cell cushion, the fuel cell cushion substantially nonabsorbent of fuel;
   adhering the fuel cell cushion directly to the fuel cell with the polyurea spray coating; and
   interposing the fuel cell cushion between the fuel cell receiving assembly and the fuel cell to cushion the fuel cell from damage.

17. The method as recited in claim 16 wherein spraying the surface of the shaped foam substrate with the polyurea spray coating to form the fuel cell cushion further comprises spraying a single layer of the polyurea spray coating onto the surface of the shaped foam substrate.

18. The method as recited in claim 16 wherein spraying the surface of the shaped foam substrate with the polyurea spray coating to form the fuel cell cushion further comprises forming a one hundred percent solids coating on the surface of the shaped foam substrate.

19. The method as recited in claim 16 further comprising spraying at least a portion of a surface of the fuel cell with the polyurea spray coating; and
   adhering the fuel cell cushion directly to the fuel cell by the polyurea spray coating on at least one of the fuel cell and the fuel cell cushion.

20. The method as recited in claim 19 wherein the step of adhering the fuel cell cushion directly to the fuel cell occurs prior to curing of the polyurea spray coating on at least one of the fuel cell and the fuel cell cushion.

* * * * *